(12) United States Patent
Yamamoto

(10) Patent No.: US 6,997,085 B2
(45) Date of Patent: Feb. 14, 2006

(54) THREADED-FASTENER WRENCHING STRUCTURE, THREADED FASTENER AND WRENCHING TOOL

(75) Inventor: Kouzou Yamamoto, Hoi-gun (JP)

(73) Assignee: OSG Corporation, Toyokawa (JP)

(*) Notice: Subject to any disclaimer, the term of this patent is extended or adjusted under 35 U.S.C. 154(b) by 33 days.

(21) Appl. No.: 10/478,843

(22) PCT Filed: May 27, 2002

(86) PCT No.: PCT/JP02/05120

§ 371 (c)(1),
(2), (4) Date: Nov. 24, 2003

(87) PCT Pub. No.: WO02/097286

PCT Pub. Date: Dec. 5, 2002

(65) Prior Publication Data

US 2004/0149088 A1    Aug. 5, 2004

(30) Foreign Application Priority Data

May 29, 2001  (JP) .............................. 2001-159973

(51) Int. Cl.
    B25B 13/06    (2006.01)
    B25B 23/16    (2006.01)
    F16B 23/00    (2006.01)
    F16B 35/06    (2006.01)

(52) U.S. Cl. .................. 81/121.1; 81/176.1; 81/176.2; 81/119; 81/DIG. 7; 411/402; 411/403; 411/405; 411/410; 411/427; 411/919

(58) Field of Classification Search ............... 81/121.1, 81/176.1, 176.2, 119, DIG. 7; 411/372, 411, 411/402, 403, 405, 410, 427, 919
See application file for complete search history.

(56) References Cited

U.S. PATENT DOCUMENTS

D203,947 S  *  3/1966  Pick .............................. D8/387

(Continued)

FOREIGN PATENT DOCUMENTS

FR          1.427.828        1/1966
JP          A 52-132971      11/1951

(Continued)

OTHER PUBLICATIONS

WO 99/27261; Amis, James P., High-Torque Resorbable Screws, Mar. 6, 1999, Internationa Application Published Under The Patent Cooperation Traty (PCT).*

*Primary Examiner*—Joseph J. Hail, III
*Assistant Examiner*—Bryan Muller
(74) *Attorney, Agent, or Firm*—Oliff & Berridge, PLC

(57) ABSTRACT

A threaded fastener capable of being reduced in size and weight. A pair of side wall surfaces of each of six radially outwardly projecting, torque transmitting portions lie on straight lines passing through the center line in a cross section perpendicular to the center line so as to transmit torque through the side wall surface, whereby the direction of a surface orthogonal force N applied to a force-applied point P by a wrenching tool coincides with the direction of an effective wrenching force F. This arrangement reduces an operation force required for rotating the wrenching tool and accordingly the load acting on each of the torque transmitting portions, in comparison with a conventional hexagonal head. That is, it is possible to reduce the diameter of the head portion of the threaded fastener and the size and weight of the head portion, while avoiding deformation of the side wall surfaces through which the torque is transmitted.

10 Claims, 12 Drawing Sheets

U.S. PATENT DOCUMENTS 3,354,757 A * 11/1967 Grimm et al. .............. 81/176.1
3,885,480 A * 5/1975 Muenchinger .............. 81/121.1
4,361,412 A * 11/1982 Stolarczyk .................. 411/402
5,327,696 A * 7/1994 McBride .................. 52/745.21
5,350,266 A * 9/1994 Espey et al. ................. 411/431
6,036,419 A * 3/2000 Lanham et al. ............. 411/405

FOREIGN PATENT DOCUMENTS

| JP | A 54-95670 | 12/1952 |
| JP | S42-15459 Y1 | 9/1967 |
| JP | S43-20671 Y1 | 8/1968 |
| JP | S58-108609 U | 7/1983 |
| JP | H02-132111 U | 11/1990 |

* cited by examiner (a)

| | STRENGTH GRADE | | |
|---|---|---|---|
| | 8.8 | 10.9 | 12.9 |
| $\tau_B / Rm$ | 0.65 | 0.62 | 0.60 |

FIG. 4

| NOMINAL SIZE OF THREAD | | A(s) (mm²) | k min (mm) | | | k min/d |
|---|---|---|---|---|---|---|
| d (mm) | P | | STRENGTH GRADE | | | STRENGTH GRADE |
| | | | 8.8 | 10.9 | 12.9 | 12.9 |
| M3 | 0.5 | 5.03 | 0.82 | 0.86 | 0.89 | 0.30 |
| M4 | 0.7 | 8.78 | 1.08 | 1.13 | 1.17 | 0.29 |
| M5 | 0.8 | 14.2 | 1.39 | 1.46 | 1.51 | 0.30 |
| M6 | 1.0 | 20.1 | 1.64 | 1.72 | 1.78 | 0.30 |
| M8 | 1.0 | 39.2 | 2.40 | 2.52 | 2.60 | 0.33 |
| | 1.25 | 36.6 | 2.24 | 2.35 | 2.43 | 0.30 |
| M10 | 1.25 | 61.2 | 3.00 | 3.14 | 3.25 | 0.33 |
| | 1.5 | 58.0 | 2.84 | 2.98 | 3.08 | 0.31 |
| M12 | 1.25 | 92.1 | 3.76 | 3.94 | 4.07 | 0.34 |
| | 1.75 | 84.3 | 3.44 | 3.61 | 3.73 | 0.31 |
| M14 | 1.5 | 125 | 4.37 | 4.59 | 4.74 | 0.34 |
| | 2.0 | 115 | 4.02 | 4.22 | 4.36 | 0.31 |
| M16 | 1.5 | 167 | 5.11 | 5.36 | 5.54 | 0.35 |
| | 2.0 | 157 | 4.81 | 5.04 | 5.21 | 0.33 |

(a)

(b)

(a)

(b)

(a)

(b)

(a)

(b)

(a)

(b)

PRIOR ART

PRIOR ART

PRIOR ART

FIG. 13

| NOMINAL SIZE OF THREAD | HEXAGONAL HEAD BOLT (JIS B1180) | | | | | HEXAGONAL HEAD BOLT WITH WASHER FLANGE (JIS B1189) | | | | |
|---|---|---|---|---|---|---|---|---|---|---|
| | s | e | k | e/d | k/d | s | e | k | e/d | k/d |
| M4 | 7 | 7.98 | 2.8 | 2.0 | 0.70 | 7 | 7.98 | 2.4 | 2.0 | 0.6 |
| M5 | 8 | 9.12 | 3.5 | 1.82 | 0.70 | 8 | 9.12 | 3.0 | 1.82 | 0.6 |
| M6 | 10 | 11.40 | 4.0 | 1.90 | 0.67 | 10 | 11.40 | 3.6 | 1.90 | 0.6 |
| M8 | 13 | 14.82 | 5.3 | 1.85 | 0.66 | 12 | 13.68 | 4.8 | 1.71 | 0.6 |
| M10 | 16 | 18.24 | 6.4 | 1.82 | 0.64 | 14 | 15.96 | 6 | 1.60 | 0.6 |
| M12 | 18 | 20.52 | 7.5 | 1.71 | 0.63 | 17 | 19.38 | 7.2 | 1.62 | 0.6 |
| M14 | 21 | 23.94 | 8.8 | 1.71 | 0.63 | 19 | 21.66 | 8.4 | 1.55 | 0.6 |
| M16 | 24 | 27.36 | 10.0 | 1.71 | 0.63 | 22 | 25.08 | 9.6 | 1.57 | 0.6 |

THREADED-FASTENER WRENCHING STRUCTURE, THREADED FASTENER AND WRENCHING TOOL

TECHNICAL FIELD

The present invention relates to a threaded-fastener wrenching structure, and more particularly to such a threaded-fastener wrenching structure which leads to reduction in size and weight of a threaded fastener.

BACKGROUND ART

Conventionally, a threaded fastener having a hexagonal head is generally widely used. In a wrenching operation of such a threaded fastener having the hexagonal head, however, a driving angle α (see FIG. 10) is 60°, namely, there is generated a component of force which component is not directed for wrenching the threaded fastener. It is therefore difficult that the hexagonal head is made compact or reduced in its diameter and axial height. As shown in FIG. 10, the driving angle α, which is 60° in case of the hexagonal head 100, corresponds to an angle between the direction of a surface orthogonal force N and the direction of an effective wrenching force F, wherein the surface orthogonal force N corresponds to a force applied to a force-applied point Q (corresponding to a vertex of the hexagon) while the effective wrenching force F corresponds to a force effective for wrenching the threaded fastener. A wrenching torque T is expressed by an expression (1) where "F" and "r" represent the effective wrenching force and a radius of the hexagonal head, respectively. In this instance, as is apparent from an expression (2), the surface orthogonal force N applied to the force-applied point Q is twice as large as the effective wrenching force F. Meanwhile, an expansive reaction force E, whose direction coincides with a radial direction of the hexagonal head, is about 1.7 times as large as the effective wrenching force F. If the radius r of the hexagonal head requires to be reduced without reduction in the wrenching torque T, the effective wrenching force F has to be increased inversely with the reduction of the radius r. For increasing the effective wrenching force F, the surface orthogonal force N and the expansive reaction force E have to be increased. That is, it will be necessary to increase an operation force for rotating the wrenching tool, thereby causing a risk of eroding the force-applied point Q, i.e., a corner portion of the hexagonal head 100.

$$T = 6 \times F \times r \quad (1)$$

$$N = F/\cos 60° = 2F \quad (2)$$

$$E = F \times \tan 60° \approx 1.7F \quad (3)$$

With respect to "Hexagonal head bolt" of JIS B1180 and "Hexagonal head bolt with washer flange" of JIS B1189, their dimensions s, e, k as indicated in FIGS. 11 and 12 are specifically defined in relation with a nominal diameter of thread as shown in FIG. 13. The dimension s represents a diameter of a circle inscribed in the contour of the hexagonal head. The dimension e represents a diameter of a circle circumscribed about the hexagonal contour. The dimension k represents a height of the hexagonal head. A ratio of the circumscribed circle diameter e with respect to the nominal thread diameter d is represented by "e/d". A ratio of the height k of the hexagonal head with respect to the nominal thread diameter d is represented by "k/d". As is apparent from FIG. 13, the circumscribed circle diameter e is not smaller than 1.55d, and the height k of the hexagonal head is not smaller than 0.6d.

The present invention was made under the above-described background with object of providing a threaded-fastener wrenching structure which makes it possible to reduce the size and weight of a threaded fastener, without reducing the wrenching torque applied to the threaded fastener.

DISCLOSURE OF INVENTION

For achieving the object, a first invention is a threaded-fastener wrenching structure comprising: a fitting hole which is provided in one of a threaded fastener and a wrenching tool for wrenching the threaded fastener; and a fitting protrusion which is provided in the other of the threaded fastener and the wrenching tool and which is to be brought into fitting engagement with the fitting hole; wherein each of the fitting hole and protrusion has a contour having a plurality of torque transmitting portions which are equi-angularly spaced apart from each other about a center line of the each of the fitting hole and protrusion and which project outwardly in a radial direction of the each of the fitting hole and protrusion, so that a wrenching torque is transmitted through the torque transmitting portions to the threaded fastener, as a result of rotation of the wrenching tool about the center line when the fitting hole and protrusion are held in fitting engagement with each other, the threaded-fastener wrenching structure being characterized in that (a) each of the torque transmitting portions has an engaging portion through which the wrenching torque is transmitted to the threaded fastener, wherein a tangent line tangent to the engaging portion substantially coincides with a straight line passing through the center line in a cross section perpendicular to the center line, and that (b) each of the torque transmitting portions has a radially outer portion which has, in a plan view thereof, a fan shape whose center is the center line, wherein a portion of the contour between each circumferentially adjacent pair of the torque transmitting portions defines a pentagonal groove or a U-shaped groove having a smoothly curved bottom surface.

A second invention is a threaded-fastener wrenching structure comprising: a fitting hole which is provided in one of a threaded fastener and a wrenching tool for wrenching the threaded fastener; and a fitting protrusion which is provided in the other of the threaded fastener and the wrenching tool and which is to be brought into fitting engagement with the fitting hole, wherein each of the fitting hole and protrusion has a contour having a plurality of torque transmitting portions which are equi-angularly spaced apart from each other about a center line of the each of the fitting hole and protrusion and which project outwardly in a radial direction of the each of the fitting hole and protrusion, so that a wrenching torque is transmitted through the torque transmitting portions to the threaded fastener, as a result of rotation of the wrenching tool about the center line when the fitting hole and protrusion are held in fitting engagement with each other, the threaded-fastener wrenching structure being characterized in that (a) each of the torque transmitting portions has an engaging portion through which the wrenching torque is transmitted to the threaded fastener, wherein a tangent line tangent to the engaging portion substantially coincides with a straight line passing through the center line in a cross section perpendicular to the center line, that (b) the threaded fastener has an external thread, that the fitting protrusion is provided in the threaded fastener, and that the fitting protrusion has a maximum diameter Dmax, a minimum diameter Dmin and a height k as measured in a direction parallel with the center line such that the maximum diameter Dmax, the minimum diameter Dmin and the height k satisfy the following expressions (4), (5), (6) which represent relationships with a major diameter d of the external thread:

$$D\max \leq 1.5d \quad (4)$$

$$1.1d < D\min \quad (5)$$

$$0.3d \leq k < 0.45d \quad (6)$$

A third invention is a threaded-fastener wrenching structure comprising: a fitting hole which is provided in one of a threaded fastener and a wrenching tool for wrenching the threaded fastener; and a fitting protrusion which is provided in the other of the threaded fastener and the wrenching tool and which is to be brought into fitting engagement with the fitting hole, wherein each of the fitting hole and protrusion has a contour having a plurality of torque transmitting portions which are equi-angularly spaced apart from each other about a center line of the each of the fitting hole and protrusion and which project outwardly in a radial direction of the each of the fitting hole and protrusion, so that a wrenching torque is transmitted through the torque transmitting portions to the threaded fastener, as a result of rotation of the wrenching tool about the center line when the fitting hole and protrusion are held in fitting engagement with each other, the threaded-fastener wrenching structure being characterized in that (a) each of the torque transmitting portions has an engaging portion through which the wrenching torque is transmitted to the threaded fastener, wherein a tangent line tangent to the engaging portion substantially coincides with a straight line passing through the center line in a cross section perpendicular to the center line, that (b) the threaded fastener has an external thread, that the fitting protrusion is provided in the threaded fastener, and that the fitting protrusion has a maximum diameter Dmax and a minimum diameter Dmin, both of which are smaller than a major diameter d of the external thread.

The tangent line tangent to the engaging portion substantially coincides with the straight line passing through the center line. This means that the intersection angle between these lines is not larger than ±3°. The engaging portion may be provided by at least a portion of each of the torque transmitting portions. It is ideal that the tangent line and the straight line passing through the center line completely coincide with each other. It is preferable that the intersection angle between these lines is not larger than ±1°.

A seventh invention is, in the threaded-fastener wrenching structure defined in any one of the first through third inventions, characterized in that the engaging portion is a flat surface having a predetermined dimension as measured in a direction of the tangent line.

An eighth invention relates to a threaded fastener, and is characterized by being provided with the fitting hole or the fitting protrusion defined in the first invention.

A ninth invention relates to a threaded fastener, and is characterized by having an external thread and being provided with the fitting protrusion defined in the second or third invention.

A tenth invention relates to a wrenching tool, and is characterized by being provided with the fitting hole or the fitting protrusion defined in the first invention.

In the threaded-fastener wrenching structure, each of the torque transmitting portions has the engaging portion through which the wrenching torque is transmitted to the threaded fastener, wherein the tangent line tangent to the engaging portion substantially coincides with the straight line passing through the center line in the cross section perpendicular to the center line. In this arrangement, the above-described driving angle α is substantially 0°, namely, the directions of the surface orthogonal force N and the effective wrenching force F substantially coincide with each other, while the expansive reaction force E is substantially 0°. Therefore, a required amount of the surface orthogonal force N is smaller than that in the case of the hexagonal head shown in FIG. 10, thereby making it possible to reduce the operation force required for rotating the wrenching tool and accordingly the load acting on each of the torque transmitting portions. That is, it is possible to reduce the diameter of the fitting hole or protrusion without reducing the wrenching torque, while avoiding deformation of the engaging portion. Thus, the threaded fastener or the wrenching tool can be made with reduction in its size and weight.

In the seventh invention, there is provided the flat surface having a predetermined dimension as measured in the direction of the tangent line, namely, there is provided the engaging portion which is flat and extends in a straight line passing substantially through the center line. Therefore, the effective force F is distributed over the flat surface, leading to reduction in a load per unit area of the surface. Thus, the threaded fastener or the wrenching tool can be made with further reduction in its size and weight.

In the second invention, the fitting protrusion provided in the threaded fastener having the external thread has the maximum diameter Dmax, the minimum diameter Dmin and the height k which satisfy the above-described expressions (4), (5), (6). Therefore, the size of the fitting protrusion in relation with the major diameter d of the external thread is reduced in comparison with a conventional hexagonal head, while deformation or fracture of each torque transmitting portion is avoided. Thus, the threaded fastener is made with reduction in its size and weight.

In the threaded fastener of the eighth invention and the wrenching tool of the tenth invention, it is possible to obtain substantially the same effect as in the above-described first invention. In the threaded fastener of the ninth invention, it is possible to obtain substantially the same effect as in the second or third invention.

In the threaded-fastener wrenching structure, it would be common that the threaded fastener such as a hexagonal head bolt is provided with the fitting protrusion while the wrenching tool is provided with the fitting hole. However, the structure may be adapted such that the threaded fastener is provided with the fitting hole (recess) while the wrenching tool is provided with the fitting protrusion (blade). Although each of the fitting hole and protrusion may be formed to be substantially parallel with the axial direction, each of the fitting hole and protrusion may be adapted to include an inclined portion or a chamfered portion which are included with respect to the center line, in the interest of facilitating its manufacture with forging process and facilitating its fitting engagement in the wrenching operation.

In general, the number of the outwardly projecting, torque transmitting portions in each of the fitting hole and protrusion is appropriately five or six. However, the number may be smaller than five or larger than six.

The engaging portion, whose tangent line substantially coincides with the straight line passing through the center line in the cross section perpendicular to the center line, is preferably provided by the flat surface having a predetermined dimension as measured in the direction of the tangent line, as in the second invention. It is preferable that the engaging portion of each of the torque transmitting portions is provided by a pair of side wall surfaces each of which has a cross sectional shape represented by a straight line extending toward the center line away from the radially outer portion. However, each of the side wall surfaces does not have to be flat, but may be curved to have an arcuate shape in its cross section such that a line tangent to a portion of the side wall surface substantially coincides with the straight line passing through the center line.

In the third invention, the minimum diameter Dmin and even the maximum diameter Dmax are smaller than the major diameter d. In such a case, the height k may be adapted, as needed, to be not smaller than 0.45d such that the fitting protrusion is given a predetermined degree of fracture strength.

In the second invention, the maximum diameter Dmax is adapted to be not larger than 1.5d and the height k is adapted to be smaller than 0.45d, for the purpose of making these dimensions smaller than those of a conventional hexagonal head bolt. The height k is adapted to be not smaller 0.3d, for the purpose of making the fracture strength of the head portion, i.e., the fitting protrusion larger than the fracture strength of the externally threaded portion when the threaded fastener is wrenched.

Further, preferably, the fitting protrusion is provided in the threaded fastener, wherein it is desirable that a central angle θ1 of each of the torque transmitting portions and a central angle θ2 of a portion of the contour between each adjacent pair of the torque transmitting portions satisfy the expression (7) described below. As a material of the wrenching tool, in "SocketWrench-Socket" of JIS B4636, for example, it is prescribed that the tool should be formed of SCM435 of JIS G4105 or its equivalent. The SCM435 belongs to strength grade 10.9, and has tensile strength of about 1040 N/mm². Meanwhile, it is common that the threaded fastener is formed of a material belonging to strength grade 8.8 and having tensile strength of 800 N/mm². Where the threaded fastener is constructed such that the expression (7) is satisfied, the torque transmitting portions of the threaded fastener are prevented from being fractured. It is noted that the above-described term "strength grade", which is used in the following description, is defined in "Mechanical properties of steel bolts and screws" of JIS B1051.

$$1.3 \leq \theta1/\theta2 \leq 1.4 \tag{7}$$

BRIEF DESCRIPTION OF DRAWINGS

FIG. 3 is a table indicating an example of ratio ($\tau_B$/Rm) of a shearing strength $\tau_B$ to a tensile strength Rm, in each strength grade of material for the threaded fastener.

FIG. 4 is a table indicating a minimum height kmin, in each strength grade of material, which was obtained by using the ratio ($\tau_B$/Rm) of FIG. 3, and also a ratio (kmin/d) in the strength grade 12.9, by way of example.

FIG. 13 is a table indicating examples of the dimensions s, e, k shown in FIGS. 11 and 12, and also "e/d" and "k/d" obtained from values of the dimensions s, e, k.

BEST MODE FOR CARRYING OUT THE INVENTION

There will be described in detail embodiments of the present invention, with reference to the drawings.

Figure 1:
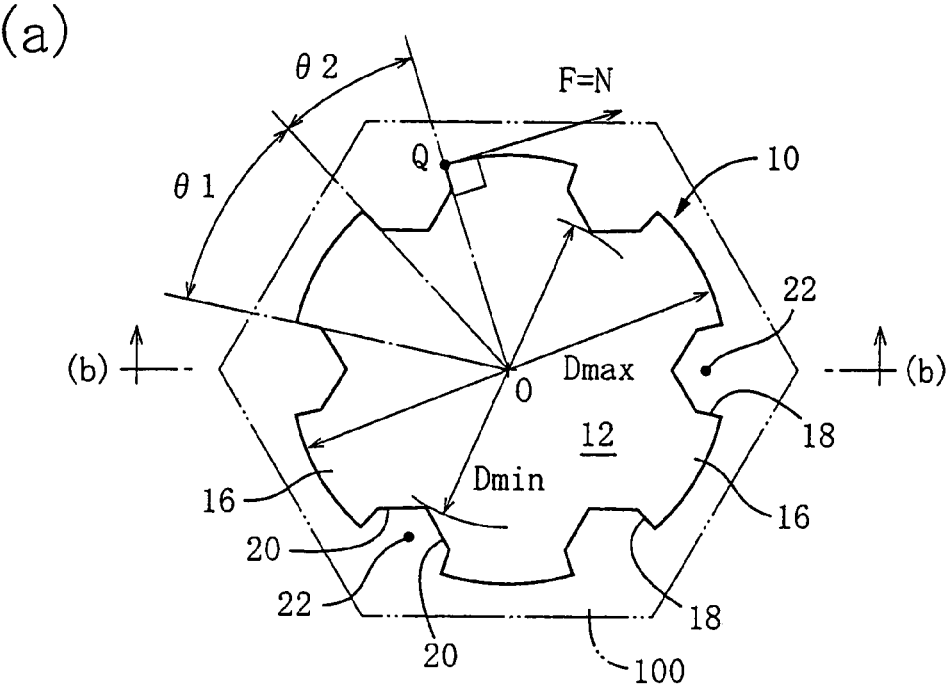
FIG. 1 is a set of views showing a threaded fastener which is one embodiment of the present invention, wherein (a) is a plan view as seen from a head portion of the threaded fastener, while (b) is a cross sectional view taken along line (b)—(b) of (a).
Figure 1:
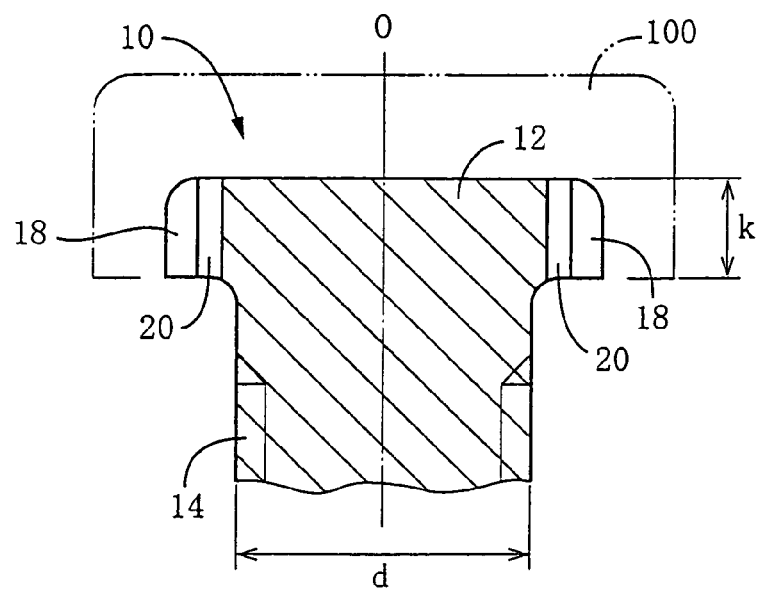
Figure 2:
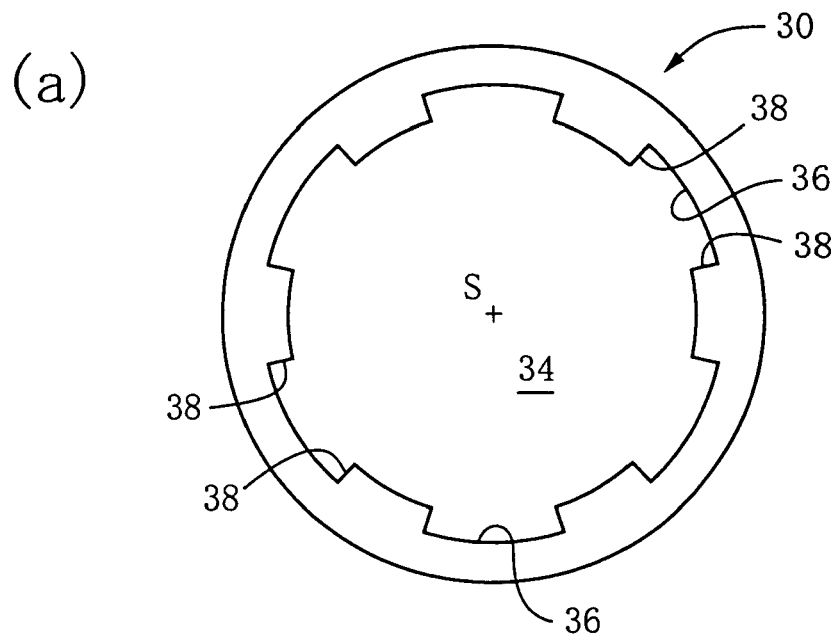
FIG. 2 is a set of views showing a wrenching tool used for wrenching the threaded fastener of FIG. 1, wherein (a) is a bottom plan view as seen from a socket portion of the wrenching tool, while (b) is a front view as seen in a direction perpendicular to the center line S.
Figure 2:
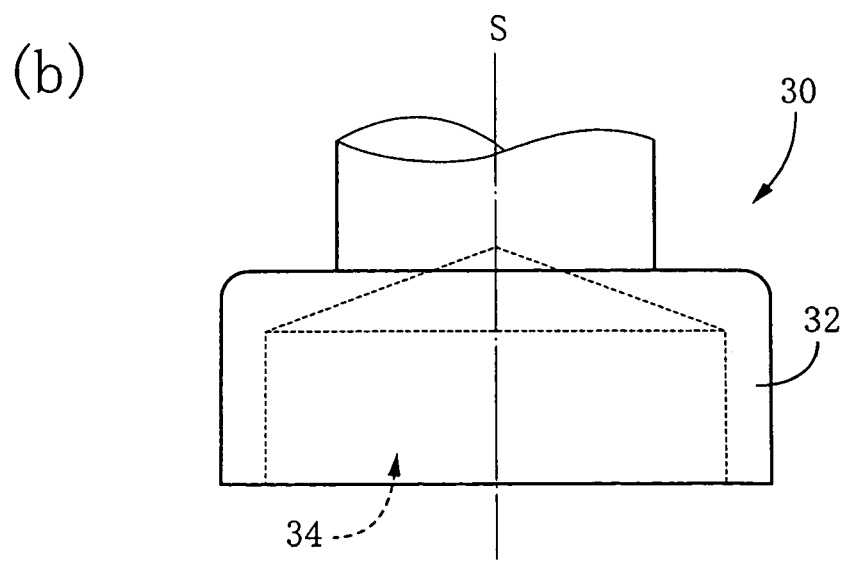

FIG. 1 is a set of views showing a threaded fastener 10 which is one embodiment of the present invention, wherein (a) is a plan view as seen from a head portion 12 of the threaded fastener 10, while (b) is a cross sectional view taken along line (b)—(b) of (a). The threaded fastener 10 has an external thread 14 which is integrally formed such that the external thread 14 is adjacent to the head portion 12 and is concentric with a center line O. FIG. 2 shows a wrenching tool 30 having a socket portion 32 which is to be brought into fitting engagement with the head portion 12. The threaded fastener 10 is rotated about the center line O by the wrenching tool 30, so as to be tightened or loosened. The head portion 12 corresponds to a fitting protrusion, and has a contour having six torque transmitting portions 16 which projects radially outwardly and which are equi-angularly spaced apart from each other at an angular interval of 60° about the center line O. As shown in the plan view of FIG. 1 (a), each of the torque transmitting portions 16 has an outer wall surface which has, in its cross section, an arcuate shape whose center coincides with the center line O. Each of the torque transmitting portions 16 further has a pair of side wall surfaces 18 corresponding to an engaging portion. Each of the side wall surfaces 18 is, in its cross section, represented by a straight line extending from the outer wall surface toward the center line O. An intersection angle defined by this straight line and a straight line passing through the center line O is substantially 0°. In the present embodiment, this intersection angle is not larger than ±1°. The outer wall surface of each transmitting portion 16 is provided by a part-cylindrical surface which is parallel with the center line O. The side wall surfaces 18 of each transmitting portion 16 are provided by flat surfaces which are parallel with the center line O. The side wall surfaces 18 of each adjacent pair of the torque transmitting portions 16 are connected to each other via a pair of inclined flat surfaces 20 which are inwardly inclined symmetrically with each other, so that a portion of the contour between each adjacent pair of the torque transmitting portions 16 defines a groove 22 which has a pentagonal shape in its cross section. It is noted that the shape represented by the plan view of FIG. 1(a) corresponds to the cross sectional shape in a plane perpendicular to the center line O.

The head portion 12 has a maximum diameter Dmax, a minimum diameter Dmin and a height k such that the maximum diameter Dmax, the minimum diameter Dmin and the height k satisfy the above-described expressions (4), (5), (6) which represent their relationships with a major diameter d of the external thread 14. Each of the torque transmitting portions 16 subtends a central angle θ1, while the portion of the contour between each adjacent pair of the torque transmitting portions 16 subtends a central angle θ2. The central angles θ1, θ2 as measured about the center line O satisfy the above-described expression (7). In FIG. 1, Dmax=1.5 d, Dmin=1.1 d, k=0.35 d, θ1/θ2≈1.4. It is noted that two-dot chain lines in FIG. 1 represents a contour of the hexagonal head 100 of the hexagonal head bolt defined by JIS B1180, for comparison with the contour of the head portion 12 of the threaded fastener 10.

On the other hand, the socket portion 32 of the wrenching tool 30 is provided by a cylindrical member having a fitting hole 34 whose bottom is defined by a bottom wall of the cylindrical member. FIG. 2(a) is a bottom plan view as seen from the socket portion 32, while FIG. 2(b) is a front view as seen in the direction perpendicular to a center line S. The fitting hole 34 has a contour having six torque transmitting portions 36 which project radially outwardly and which are equi-angularly spaced apart from each other at an angular interval of 60° about the center line S. In the bottom plan view of FIG. 2(a), each of the torque transmitting portions 36 has a fan shape, and has the engaging portion in the form of a pair of side wall surfaces 38 each of which is, in its cross section, represented by a straight line extending in a direction away from the radially outer portion toward the center line S. The fitting hole 34 has dimensions each of which is adapted to be slightly larger than a corresponding one of dimensions of the head portion 12, so that the fitting hole 34 can be fitted on the head portion 12. In a wrenching operation in which the threaded fastener 10 is wrenched by the wrenching tool 30, the socket portion 32 is concentrically fitted on the head portion 12 such that the torque transmitting portions 16 of the head portion 12 are received in the respective torque transmitting portions 36 of the fitting hole 34. The socket portion 32 of the wrenching tool 30 is then rotated about the center line S, so that the torque is transmitted to the threaded fastener 10 through the side wall surfaces 38, 18.

In a threaded-fastener wrenching structure constituted by the threaded fastener 10 and the wrenching tool 30 which are constructed as described above, each of the six torque transmitting portions 16, 36 has the side wall surfaces 18, 38 through which the wrenching torque is transmitted to the threaded fastener 10. Since each of the side wall surfaces 18, 38 lies on a straight line passing through the center line O, S in the cross section perpendicular to the center lines O, S, the direction of a surface orthogonal force N applied by the wrenching tool 30 to a force-applied point Q coincides with a circumferential direction about the center line O, namely, the direction of an effective wrenching force F which is effective for wrenching the fastener 10, while an expansive component force E becomes substantially zero. Therefore, a required amount of the surface orthogonal force N becomes smaller than that in the case of the conventional hexagonal head 100, thereby making it possible to reduce the operation force required for rotating the wrenching tool 30 and accordingly reduce the load acting on each of the torque transmitting portions 16, 36. That is, it is possible to reduce the diameter of the head portion 12 of the fastener 10 and accordingly reduce the size and weight of the head portion 12 of the fastener 10, while assuring a predetermined amount of the effective wrenching torque and avoiding deformation of the side wall surfaces 18, 38.

Particularly, in the present embodiment in which the flat side wall surfaces 18, 38 each provided to lie on the straight line passing through the center lines O, S, the effective wrenching force F is distributed over the flat side wall surface, leading to reduction in a load acting on an unit area of the surface. Thus, the head portion 12 of the threaded fastener 10 can be made with further reduction in its size and weight.

That is, in the present embodiment in which the head portion 12 of the threaded fastener 10 has the maximum diameter Dmax of 1.5d and the height k of 0.35d, the size of the head portion 12 is considerably smaller than the conventional hexagonal head 100 as is apparent from FIG. 1, whereby the fastener 10 can be made with reduction in its size and weight.

In the study of the height k of the head portion 12, the maximum tensile strength Fmax of the external thread 14 and the maximum tensile strength Fmax of the head portion 12 are respectively expressed by the following expressions (8), (9) in which tensile strength Rm of the material of the threaded fastener, effective cross sectional area A(s) of the external thread 14, shearing strength 1B of the material of the threaded fastener and shearing area Ask (=k×π×d) of the head portion 12 are used. Since the maximum tensile strength Fmax of the head portion 12 requires to be larger than the maximum tensile strength Fmax of the external thread 14, namely, since Fmax (head portion)>Fmax (thread), the following expression (10) is obtained. The minimum height Kmin is expressed by the following expression (11).

$$F\max \text{ (thread)} = Rm \times A(s) \tag{8}$$

$$F\max \text{ (head portion)} = \tau_B \times Ask \tag{9}$$

$$\tau_B \times k \times \pi \times d > Rm \times A(s) \tag{10}$$

$$k\min = (Rm \times A(s))/(\tau_B \times \pi \times d) \tag{11}$$
$$= A(s)/[(\tau_B/Rm) \times \pi \times d]$$

On the other hand, the ratio ($\tau_B$/Rm) of the shearing strength $\tau_B$ to the tensile strength Rm of the material of the fastener is determined in each strength grade, as shown in the table of FIG. 3, according to "Systematic calculation of high duty bolted joints" defined in VDI 2230 of German Association of Engineers. The table of FIG. 4 shows the minimum height kmin obtained from the above-described expression (11), for each strength grade in the threaded fasteners 10 having different diameters d. The rightmost column of the table of FIG. 4 indicates the ratio (kmin/d) in the strength grade 12.9. Therefore, the height k of 0.35d as in the present embodiment provides a sufficient degree of shearing strength even in case of the strength grade 12.9. In case of the strength grade 8.8 or 10.9, namely, in alleviated condition, a sufficient degree of shearing strength is obtained even if the height k is about 0.3d.

In the present embodiment in which the angle θ1 of each torque transmission portion 16 and the angle θ2 of each groove 22 satisfy the relationship expressed by the above-described expression (7), each torque transmitting portion 16 of the threaded fastener 10 is advantageously prevented from being fractured. Where the material of the threaded fastener 10 belongs to the strength grade 8.8 while the material of the wrenching tool 30 is, as defined in "SocketWrench-Socket" of JIS B4636, SCM435 of JIS G4105 which belongs to the strength grade 10.9, namely, where the tensile strength of the material of the threaded fastener 10 is about 800 N/mm$^2$ while the tensile strength of the material of the wrenching tool 30 is about 1040 N/mm$^2$, the fracture strength of the threaded fastener 10 is larger than that of the wrenching tool 30 if the expression (7) is satisfied.

Next, there will be explained other embodiments of the present invention. It is noted that the same reference numerals as used in the above-described embodiment will be used to identify the substantially similar portions, which will not be explained in detail.

Figure 5:
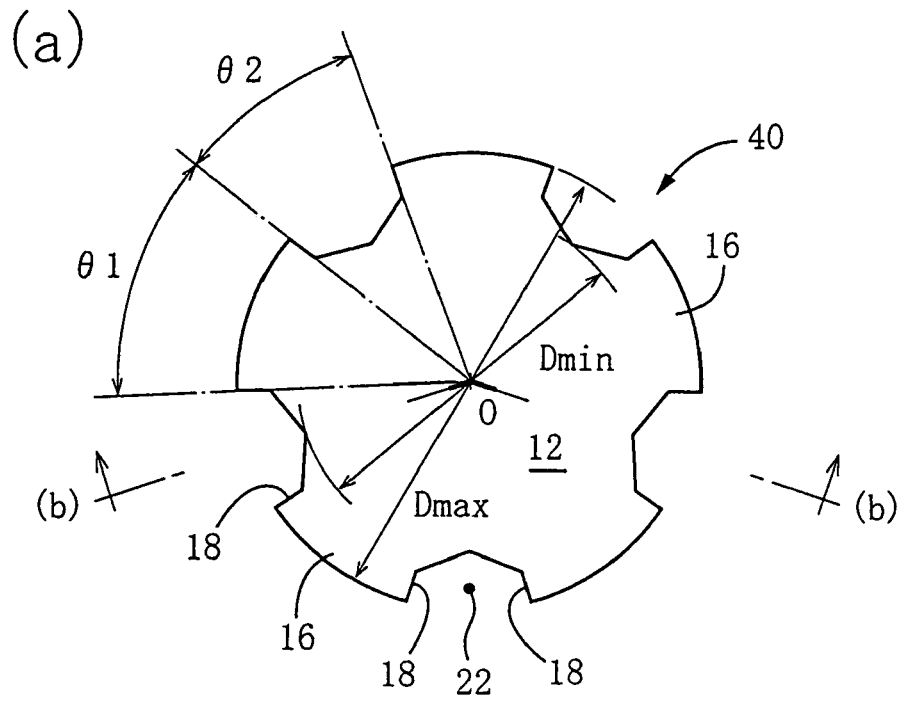
FIG. 5 is a set of views explaining another embodiment of the invention, and corresponding to FIG. 1.
Figure 5:
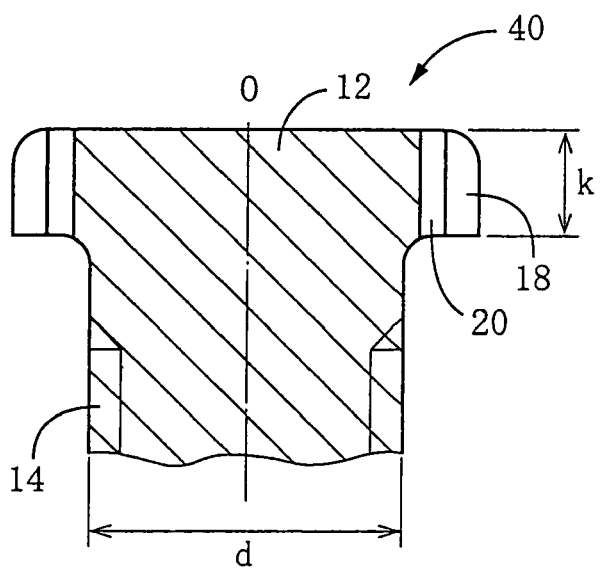

FIG. 5 shows a threaded fastener 40 in which five torque transmitting portions 16 are equi-angularly spaced apart from each other about the center line O, wherein the dimensions Dmax, Dmin, k, θ1, θ2 are set to satisfy the above-described expressions (4), (5), (6) and (7).

Figure 6:
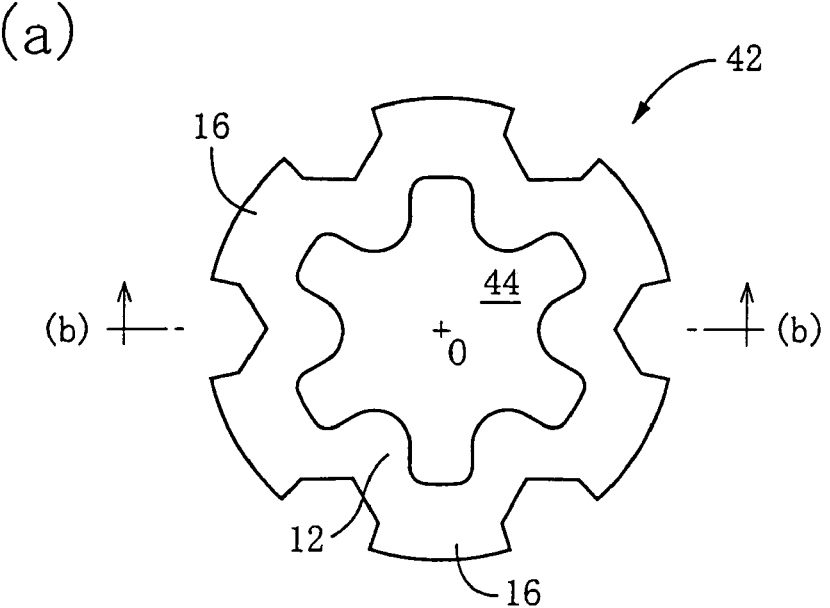
FIG. 6 is a set of views explaining still another embodiment of the invention, and corresponding to FIG. 1.
Figure 6:
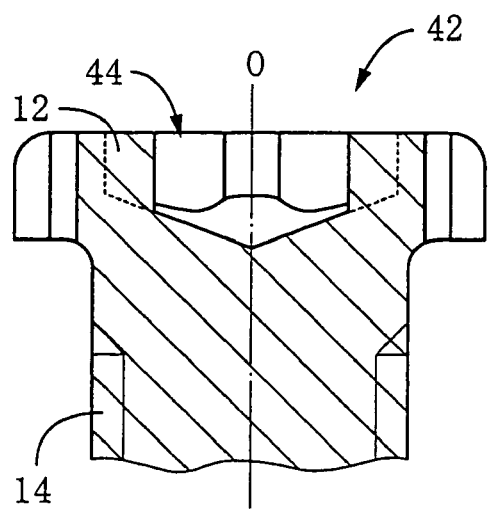

FIG. 6 shows a threaded fastener 42 in which a recess 44 is formed in the head portion 12 of the threaded fastener 10. The recess 44 has six grooves corresponding to the torque transmitting portions 16. This threaded fastener 42 can be wrenched by using two kinds of wrenching tools. It is noted that the recess 44 is not essential for the present invention and does not have to have an engaging portion which substantially coincides with a straight line passing through the center line O.

Figure 7:
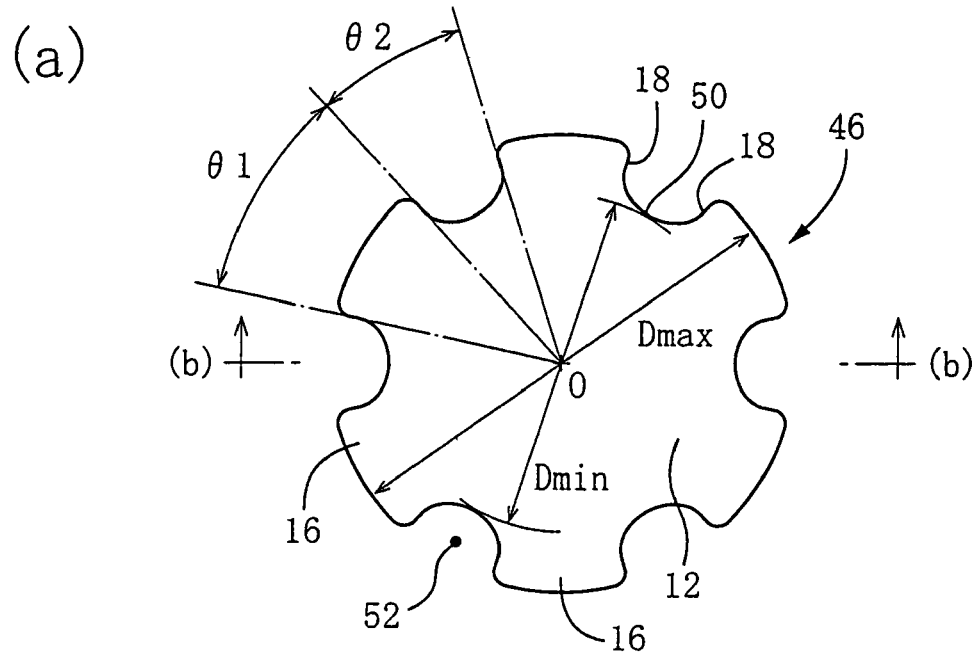
FIG. 7 is a set of views explaining another embodiment of the invention, and corresponding to FIG. 1.
Figure 7:
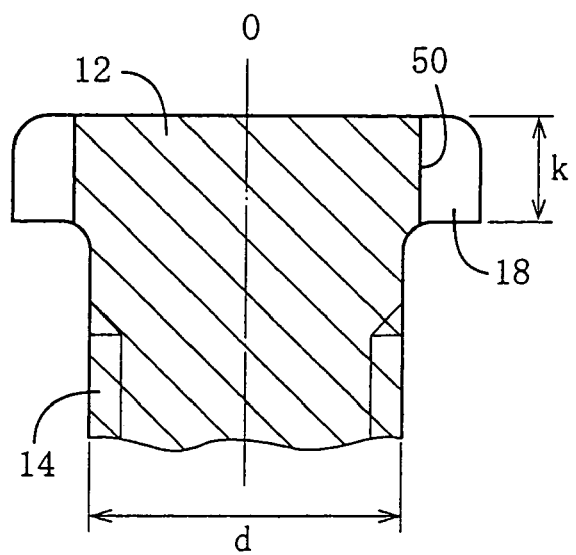
Figure 8:
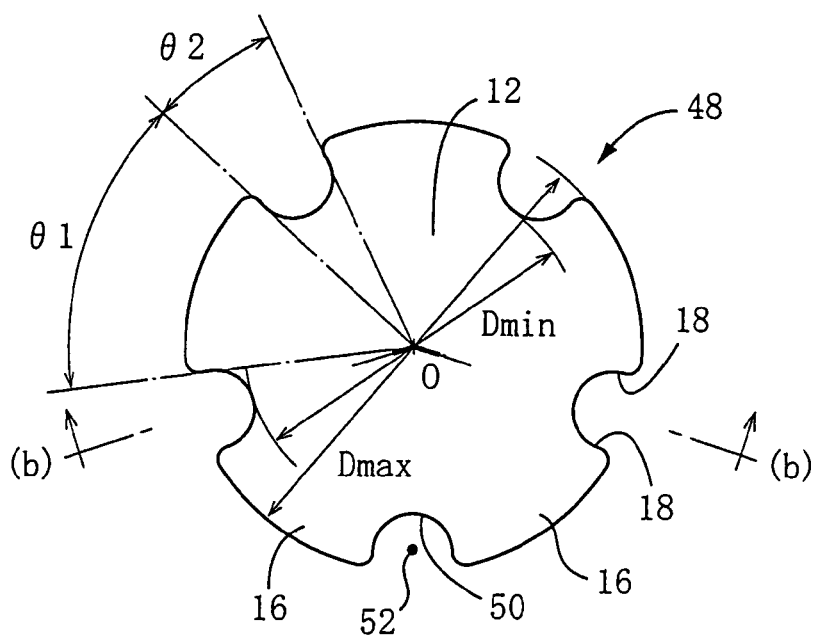
FIG. 8 is a set of views explaining still another embodiment of the invention, and corresponding to FIG. 1.
Figure 8:
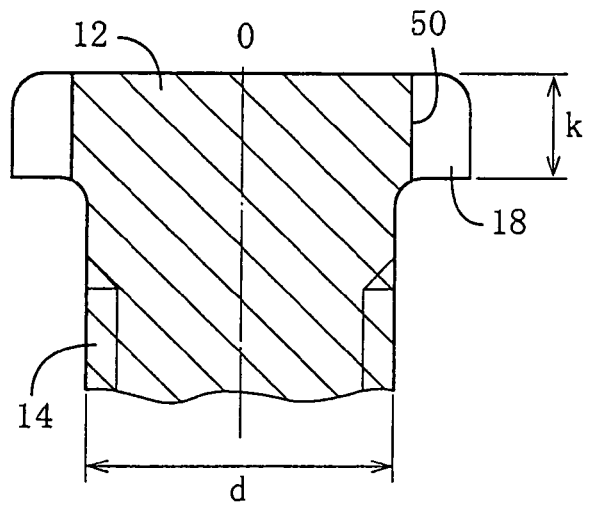

FIGS. 7 and 8 show threaded fasteners 46, 48 in each of which the pentagonal grooves 22 are replaced by U-shaped grooves 52 each having a substantially semi-circular-shaped bottom surface 50 that is curved smoothly from the flat side wall surfaces 18. Each of the grooves 52 has widthwise opposite edges that are rounded. Each of the threaded fasteners 46, 48 provides the same effect as the threaded fasteners 10, 40.

Figure 9:
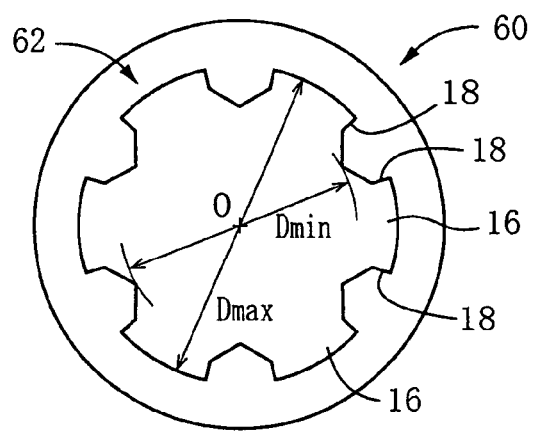
FIG. 9 is a set of views explaining still another embodiment of the invention, wherein (a) is a plan view as seen from its head portion, while (b) is a front view as seen in a direction perpendicular to its center line.
Figure 9:
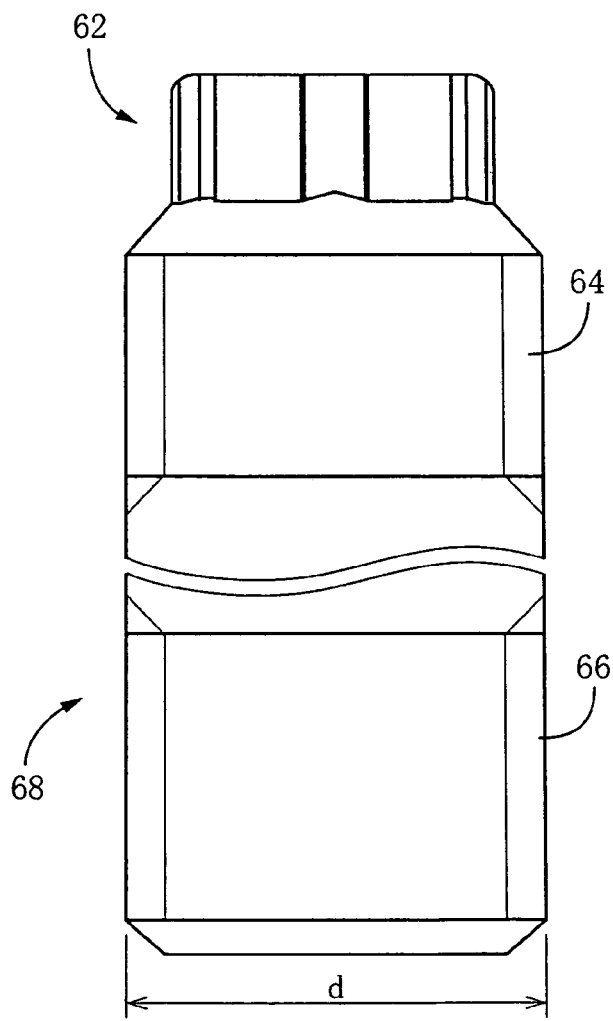
Figure 10:
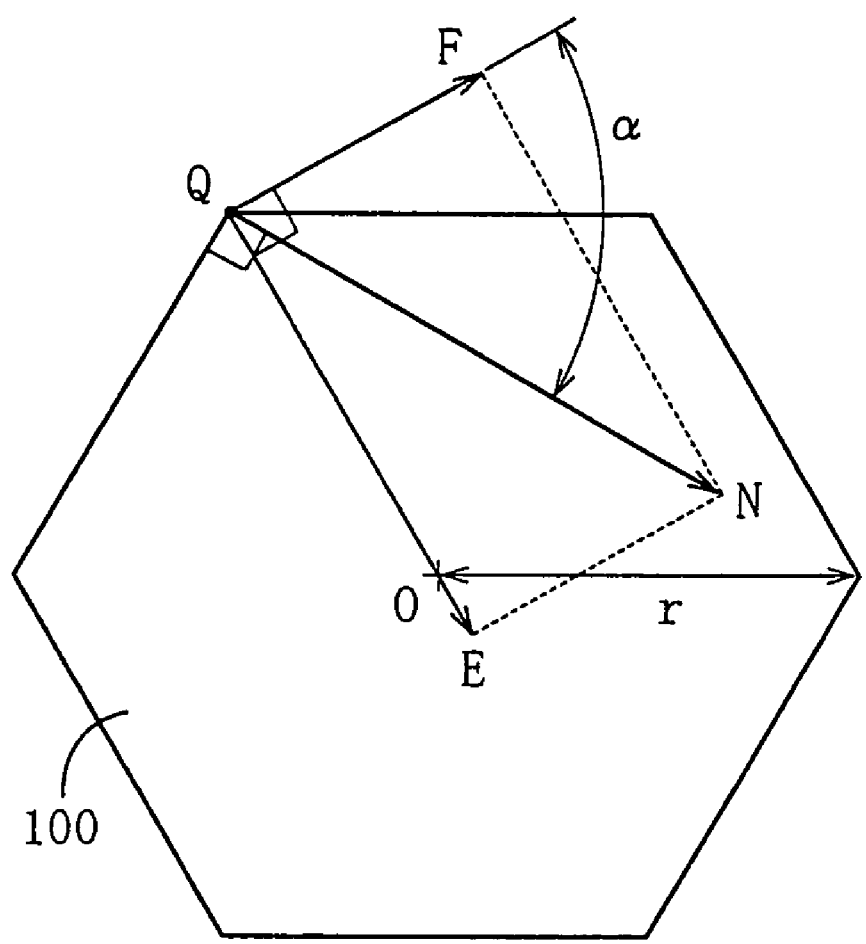
FIG. 10 is a view showing a hexagonal head of a conventional hexagonal head bolt.
Figure 11:
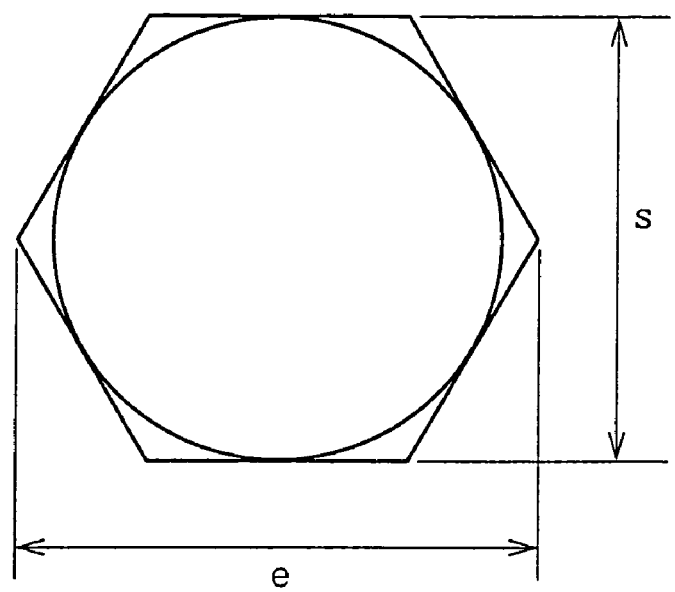
FIG. 11 is a set of views showing dimensions s, e, k, d in "Hexagonal head bolt" of JIS B1180.
Figure 11:
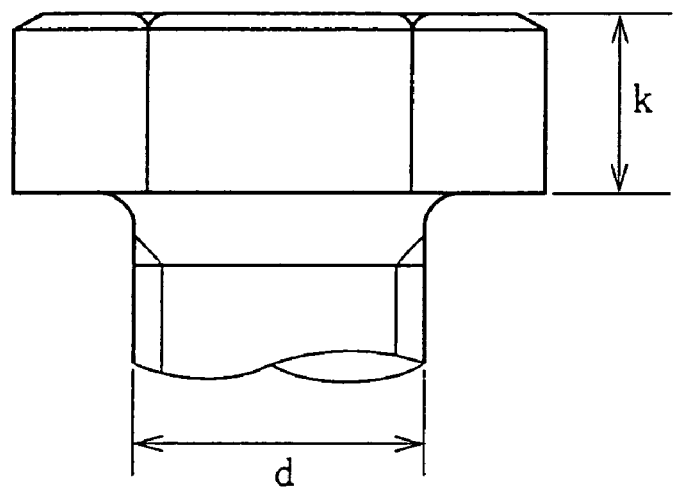
Figure 12:
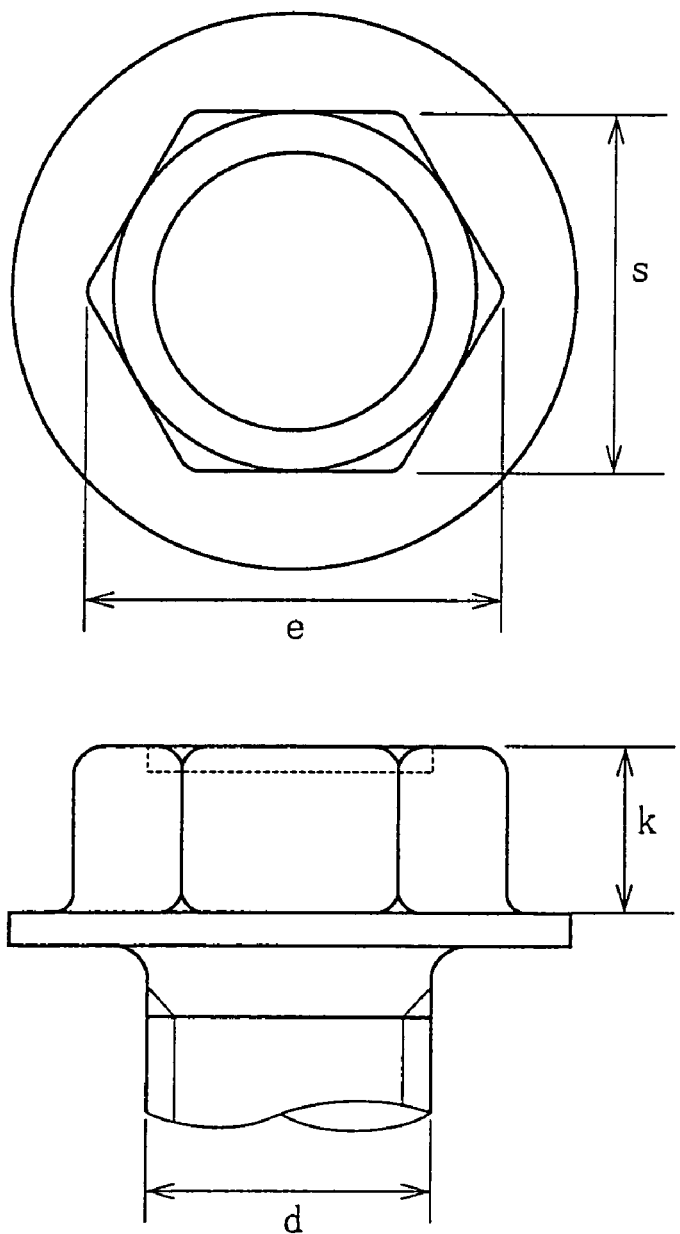
FIG. 12 is a set of view showing dimensions s, e, k, d in "Hexagonal head bolt with flange washer" of JIS B1189.

FIG. 9 shows a studbolt 60 to which the principle of the present invention is applied. The studbolt 60 includes a threaded portion 68 which has a pair of external threads 64, 66, and a head portion 62 which serves as the fitting protrusion and which is coaxial with the threaded portion 68. The head portion 62 has, in its plan view, the same configuration as the above-described head portion 12. Thus, like the head portion 12, the head portion 62 has a contour having the six torque transmitting portions 16 each having the pair of side wall surfaces 18. However, either of the diameters Dmax, Dmin is smaller than the major diameter d of the external threads 64, 66. In this embodiment, too, since the torque is transmitted through the flat side wall surfaces 18 lying on the straight lines passing through the center line O in the plan view, namely, since the direction of the force (=surface orthogonal force N) applied to each side wall surface 18 is the same as the direction of the effective wrenching force F, each side wall surface 18 is being prevented from being deformed, even if a required amount of the wrenching force F is increased due to the reduction of the size of the head portion 62. It is noted that FIG. 9 (a) is the plan view as seen from the head portion 62 while FIG. 9 (b) is the front view as seen in the direction perpendicular to the center line.

The embodiments of the present invention have been explained in detail with reference to the drawings. However, each of the embodiments is merely an embodied form, and the present invention can be embodied with various modifications and improvements on the basis of knowledge of those skilled in the art.

The invention claimed is:
1. A threaded-fastener wrenching structure, comprising:
a fitting hole which is provided in one of a threaded fastener and a wrenching tool for wrenching said threaded fastener; and
a fitting protrusion which is provided in the other of said threaded fastener and said wrenching tool and which is to be brought into fitting engagement with said fitting hole;
wherein:
each of said fitting hole and protrusion has a contour having a plurality of torque transmitting portions which are equi-angularly spaced apart from each other about a center line of said each of said fitting hole and protrusion and which project outwardly in a radial direction of said each of said fitting hole and protrusion, so that a wrenching torque is transmitted through said torque transmitting portions to said threaded fastener, as a result of rotation of said wrenching tool about said center-line when said fitting hole and protrusion are held in fitting engagement with each other;
each of said torque transmitting portions has an engaging portion through which the wrenching torque is transmitted to said threaded fastener, wherein a tangent line tangent to said engaging portion substantially coincides with a straight line passing through said center line in a cross section perpendicular to said center line;
said threaded fastener has an external thread;
said fitting protrusion is provided in said threaded fastener; and
said fitting protrusion has a maximum diameter Dmax, a minimum diameter Dmin and a height k as measured in a direction parallel with said center line such that said maximum diameter Dmax, said minimum diameter Dmin and said height k satisfy the following expressions (4), (5), (6) which represent relationships with a major diameter d of said external thread:

$$D\max \leq 1.5d \tag{4}$$

$$1.1d < D\min \tag{5}$$

$$0.3d \leq k < 0.45d \tag{6}$$

2. The threaded-fastener wrenching structure according to claim 1, wherein an intersection angle between said tangent line and said straight line passing through said center line is no more than +3° and no less than −3°.

3. The threaded-fastener wrenching structure according to claim 1, wherein an intersection angle between said tangent line and said straight line passing through said center line is no more than +1° and no less than −1°.

4. The threaded-fastener wrenching structure according to claim 1, wherein said plurality of torque transmitting portions consist of five or six torque transmitting portions.

5. The threaded-fastener wrenching structure according to claim 1, wherein said engaging portion is a flat surface having a predetermined dimension as measured in a direction of said tangent line.

6. A threaded fastener, having an external thread, and provided with the fitting protrusion defined in claim 1.

7. The threaded-fastener wrenching structure according to claim 1,
wherein said fitting protrusion is provided in said threaded fastener
and a central angle θ1 of each of said torque transmitting portions and a central angle θ2 of a portion of said contour between each adjacent pair of said torque transmitting portions satisfy the following expression (7):

$$1.3 \leq \theta1/\theta2 \leq 1.4 \quad (7).$$

8. A threaded-fastener wrenching structure, comprising:
a fitting hole which is provided in one of a threaded fastener and a wrenching tool for wrenching said threaded fastener; and
a fitting protrusion which is provided in the other of said threaded fastener and said wrenching tool and which is to be brought into fitting engagement with said fitting hole;
wherein:
each of said fitting hole and protrusion has a contour having a plurality of torque transmitting portions which are equi-angularly spaced apart from each other about a center line of said each of said fitting hole and protrusion and which project outwardly in a radial direction of said each of said fitting hole and protrusion, so that a wrenching torque is transmitted through said torque transmitting portions to said threaded fastener, as a result of rotation of said wrenching tool about said center line when said fitting hole and protrusion are held in fitting engagement with each other;
each of said torque transmitting portions has:
an engaging portion through which the wrenching torque is transmitted to said threaded fastener,
wherein a tangent line tangent to said engaging portion substantially coincides with a straight line passing through said center line in a cross section perpendicular to said center line; and
a radial outer end surface which is provided by a part of a cylindrical surface whose center is said center line;
said threaded fastener has an external thread;
said fitting protrusion is provided in said threaded fastener; and
said fitting protrusion has a maximum diameter Dmax, a minimum diameter Dmin and a height k as measured in a direction parallel with said center line such that said maximum diameter Dmax, said minimum diameter Dmin and said height k satisfy the following expressions (4), (5), (6) which represent relationships with a major diameter d of said external thread:

$$D\text{max} \leq 1.5d \quad (4)$$

$$1.1d < D\text{min} \quad (5)$$

$$0.3d \leq k < 0.45d \quad (6).$$

9. The threaded-fastener wrenching structure according to claim 8, wherein a portion of said contour between each circumferentially adjacent pair of said torque transmitting portions defines a groove which has a pentagonal shape in a cross section perpendicular to said center line.

10. The threaded-fastener wrenching structure according to claim 8, wherein a portion of said contour between each circumferentially adjacent pair of said torque transmitting portions defines a groove which has a U shape in a cross section perpendicular to said center line.

* * * * *